US010055498B2

(12) United States Patent
Spaulding et al.

(10) Patent No.: US 10,055,498 B2
(45) Date of Patent: Aug. 21, 2018

(54) METHODS FOR ASSESSING AND SCORING USER PROFICIENCY IN TOPICS DETERMINED BY DATA FROM SOCIAL NETWORKS AND OTHER SOURCES

(71) Applicant: ORACLE INTERNATIONAL CORPORATION, Redwood Shores, CA (US)

(72) Inventors: Kent Spaulding, Portland, OR (US); Yasin Cengiz, Irvine, CA (US); Elizabeth Lingg, Pleasanton, CA (US); Rana Meraj Rasool, Brooklyn, NY (US)

(73) Assignee: Oracle International Corporation, Redwood Shores, CA (US)

( * ) Notice: Subject to any disclaimer, the term of this patent is extended or adjusted under 35 U.S.C. 154(b) by 303 days.

(21) Appl. No.: 14/793,033

(22) Filed: Jul. 7, 2015

(65) Prior Publication Data

US 2017/0011039 A1   Jan. 12, 2017

(51) Int. Cl.
*G06F 7/00*        (2006.01)
*G06F 17/30*      (2006.01)
(Continued)

(52) U.S. Cl.
CPC .. *G06F 17/30867* (2013.01); *G06F 17/30958* (2013.01); *G06Q 50/01* (2013.01); *G09B 7/00* (2013.01)

(58) Field of Classification Search
CPC ........ G06F 17/30867; G06F 17/30958; G06Q 50/01; G09B 7/00
See application file for complete search history.

(56) References Cited

U.S. PATENT DOCUMENTS 6,502,081 B1   12/2002   Wiltshire, Jr. et al.
7,143,091 B2 *  11/2006   Charnock ......... G06F 17/30716
(Continued)

FOREIGN PATENT DOCUMENTS

WO   2011119864 A1   9/2011
WO   2014074607 A2   5/2014

OTHER PUBLICATIONS

Author Unknown, "Neudesic Adds Innovative Skills, Expertise and Endorsement Capabilities to New Release of Social Business Software" Neudesic, accessed on Aug. 3, 2015, 3 pages. Retrieved from: http://www.prnewswire.com/news-releases/neudesic-adds-innovative-skills-expertise-and-endorsement-capabilities-to-new-release-of-social-business-software-211954401.html.

(Continued)

*Primary Examiner* — Tuan A Pham
*Assistant Examiner* — Thai V Dang
(74) *Attorney, Agent, or Firm* — Kilpatrick Townsend and Stockton LLP

(57) ABSTRACT

Embodiments provide for assessing and scoring user proficiency in topics determined by data from social networks and other sources. Embodiments can combine the information available to direct models, e.g., using user profiles, endorsements, etc., with data from various other external knowledge bases to find implicit topics for users, and other types of reasoning to compute proficiency scores. Implicit topics, i.e., those topics related to explicitly identified areas of expertise, can be determined based on a topic graph such as a Directed Acyclic Graph (DAG). Generally speaking, embodiments can traverse the topic graph for explicitly identified skills or topics and determine related or similar new skills based on nearby nodes of the graph. This approach can uncover skills that user that may not have (Continued)

disclosed as well as scoring users on skills based on the skill's similarity to those the user did claim.

15 Claims, 8 Drawing Sheets

(51) Int. Cl.
*G06Q 50/00* (2012.01)
*G09B 7/00* (2006.01)

(56) References Cited

U.S. PATENT DOCUMENTS

| | | | |
|---|---|---|---|
| 7,240,055 | B2 | 7/2007 | Grasso et al. |
| 7,827,125 | B1 | 11/2010 | Rennison |
| 2001/0044795 | A1 | 11/2001 | Cohen et al. |
| 2007/0294350 | A1 | 12/2007 | Kumar et al. |
| 2010/0228777 | A1 | 9/2010 | Imig et al. |
| 2011/0078188 | A1 | 3/2011 | Li et al. |
| 2013/0110567 | A1 | 5/2013 | Omar |
| 2013/0124268 | A1 | 5/2013 | Hatton et al. |
| 2014/0025441 | A1 | 1/2014 | Eberlein et al. |
| 2014/0214818 | A1 | 7/2014 | Du et al. |
| 2015/0120717 | A1* | 4/2015 | Kim ................ G06F 17/30699 707/727 |
| 2015/0120782 | A1* | 4/2015 | Kim .................... G06F 17/3053 707/798 |
| 2016/0117397 | A1 | 4/2016 | Bansal et al. |
| 2016/0267188 | A1 | 9/2016 | Spaulding et al. |

OTHER PUBLICATIONS

Author Unknown, "Sevendays FAQ" Sevendays accessed on Aug. 3, 2015, 2 pages. Retrieved from: https://www.sevendays.co/faq.

Author Unknown, "Skills-Pilot" Salesforce Release Notes, accessed on Aug. 3, 2015, 357 pages. Retrieved from: https://resources.docs.salesforce.com/188/latest/en-us/sfdc/pdf/salesforce_spring14_release_notes.pdf.

Author Unknown, "Using Skills and Expertise" Jive Software, accessed on Aug. 3, 2015, 1 page. Retrieved from:https://docs.jivesoftware.com/jivecloud/community_user/index.jsp?topic=/com.jivesoftware.help.sbs.online/user/SkillsandExpertise.html.

Smith-Proulx, Laura, "How LinkedIn Skills Endorsements Impact Your Job Search" NETability, Inc., accessed on Aug. 3, 2015, 7 pages. Retrieved from: http://www.job-hunt.org/social-networking/LinkedIn-job-search/LinkedIn-skills-endorsements.shtml.

U.S. Appl. No. 14/656,053, Non-Final Office Action dated Jul. 26, 2017, 9 pages.

U.S. Appl. No. 14/656,053, Notice of Allowance dated Jun. 20, 2018, 14 pages.

U.S. Appl. No. 14/656,053, Final Office Action dated Feb. 12, 2018, 11 pages.

* cited by examiner

METHODS FOR ASSESSING AND SCORING USER PROFICIENCY IN TOPICS DETERMINED BY DATA FROM SOCIAL NETWORKS AND OTHER SOURCES

BACKGROUND OF THE INVENTION

Embodiments of the present invention relate generally to methods and systems for determining a level of expertise of a potential subject matter expert and more particularly to assessing and scoring user proficiency in topics determined by data from social networks and other sources.

Social networks and other networks or systems, such as a corporation's Intranet and/or Human Capital Management (HCM) system for example, can have a wealth of data about people and their skill-sets. For example, a user can define a social network profile in which can be identified various skills, experience, training, etc. that user claims to have. In some cases, other users can endorse or otherwise indicate agreement or support for those claimed skills or may indicate other, additional skills for the user. In the case of an HCM system, an employee's resume, educational and/or training history, work experience, and/or other information can be maintained. This data can be used to determine for which topics and/or skills a user claims proficiency in. However, this information may need to be confirmed and claimed skills for a particular individual or set of individuals may be scored before it is relied upon in some way.

Current solutions for proficiency scoring rely on direct models, namely, users endorsing themselves and each other on topics that the users claim for themselves or others. For example, the more endorsements for a given skill, the more proficient the user is considered to be. However, and especially with social networks, rather than being proficient, the user may simply be popular among a group of peers. HCM systems also often allow users to self-assess, take exams, or be assessed, for example, their manager or peers, all of which can provide a rating for that individual on a particular skill. While more such information may be more reliable than peer endorsements on a social network, it is also limited to the explicitly defined skill and does not consider similar or related skills that the user may also be considered proficient in. Hence, there is a need for improved methods and systems for determining a level of expertise of a potential subject matter expert.

BRIEF SUMMARY OF THE INVENTION

Embodiments of the invention provide systems and methods for assessing and scoring user proficiency in topics determined by data from social networks and other sources. According to one embodiment, assessing a scoring proficiency of an individual on one or more topics can comprise collecting topic information related to the individual from a plurality of data sources. In some cases, the plurality of data sources can comprise one or more social networks sites. One or more topics can be identified within the collected topic information. Each topic can comprise a particular skill or knowledge of the individual.

A graph score can be calculated for each identified topic based on a topic graph. For example, the topic graph can comprise a Directed Acyclic Graph (DAG), wherein nodes of the graph represent topics and a degree of similarity between those topics based on proximity of the nodes in the graph. Calculating the graph score for each identified topic based on the topic graph can comprise searching for each identified topic in the topic graph. For each identified topic matching a topic defined in the topic graph, the matching topic can be scored for a direct match, one or more related topics can be identified based on the topic graph, the one or more related topics can be added to the identified topics, and the related topics can be scored based on a similarity to the matching topic indicated by the topic graph.

A proficiency score can be calculated for each topic based on a type for the topic information in which the topic was identified. The type of reference can comprise a recommendation of the individual by another, an accomplishment of the individual, or an endorsement of the individual by another. The proficiency score of each topic can comprise a weighted average of occurrences of the topic in the topic information. Each occurrence of each topic can be weighted by a type of reference made to the topic in the topic information.

An overall expertise score can be calculated for each topic based on the graph score and the proficiency score for the topic. For example, the overall expertise score for each topic can comprise a sum of the graph score for the topic and the proficiency score for the topic. An indication of each topic and the overall expertise score for each topic can be stored in profile information for the individual.

DETAILED DESCRIPTION OF THE INVENTION

Figure 1:
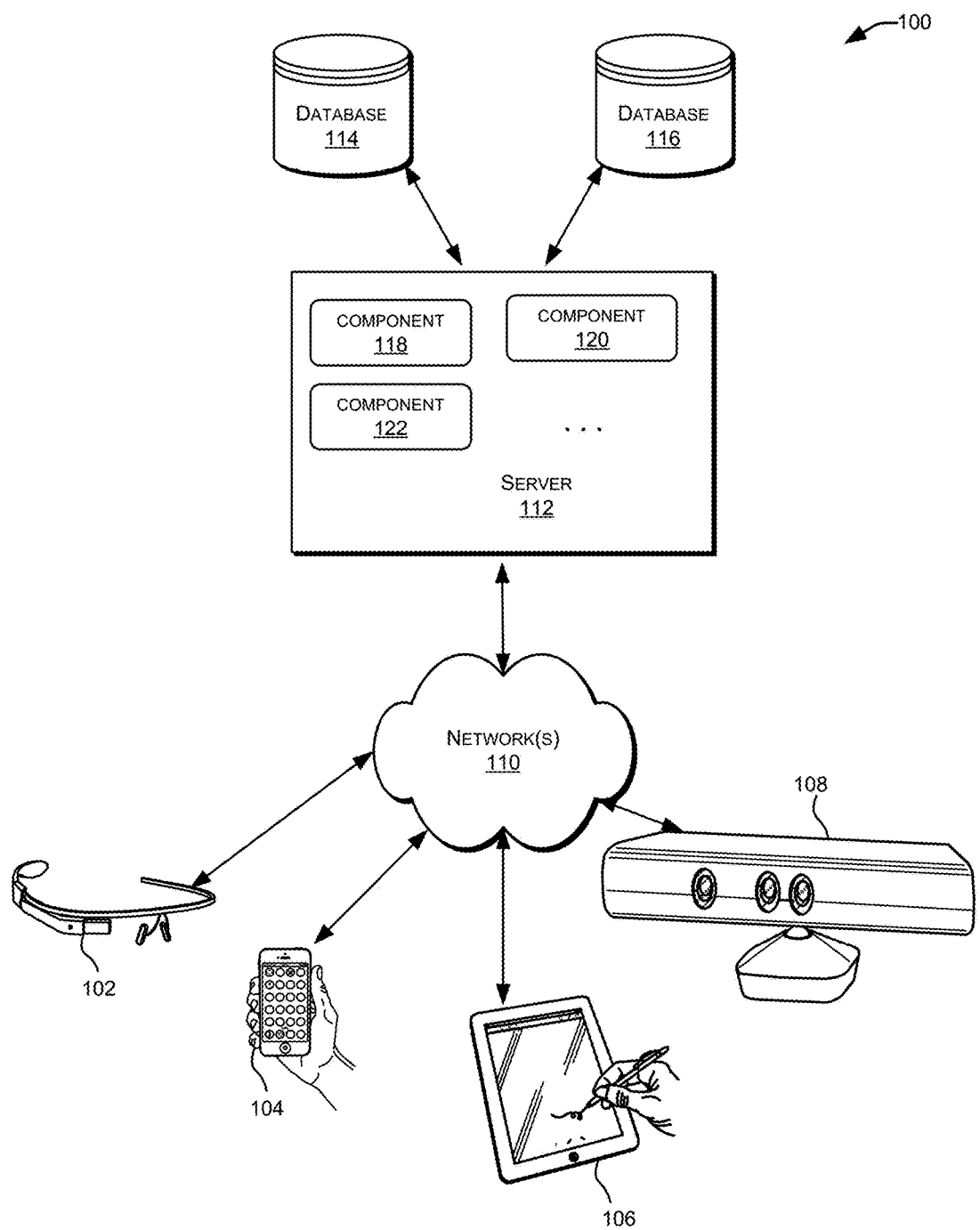
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for determining a level of expertise of a potential subject matter expert. More specifically, embodiments of the present invention provide systems and methods for assessing and scoring user proficiency in topics determined by data from social networks and other sources. Embodiments can combine the information available to direct models, e.g., using user profiles, endorsements, etc., with data from various other external knowledge bases to find implicit topics for users, and other types of reasoning to compute proficiency scores. Implicit topics, i.e., those topics related to explicitly identified areas of expertise, can be determined based on a topic graph such as a Directed Acyclic Graph (DAG). Generally speaking, embodiments can traverse the topic graph for explicitly identified skills or topics and determine related or similar new skills based on nearby nodes of the graph. This approach can uncover skills that user that may not have disclosed as well as scoring users on skills based on the skill's similarity to those the user did claim. This allows a talent search application to find individuals who are not perfect fits based on claimed skills, but who may nonetheless be a match for the given set of requirements. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices, running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
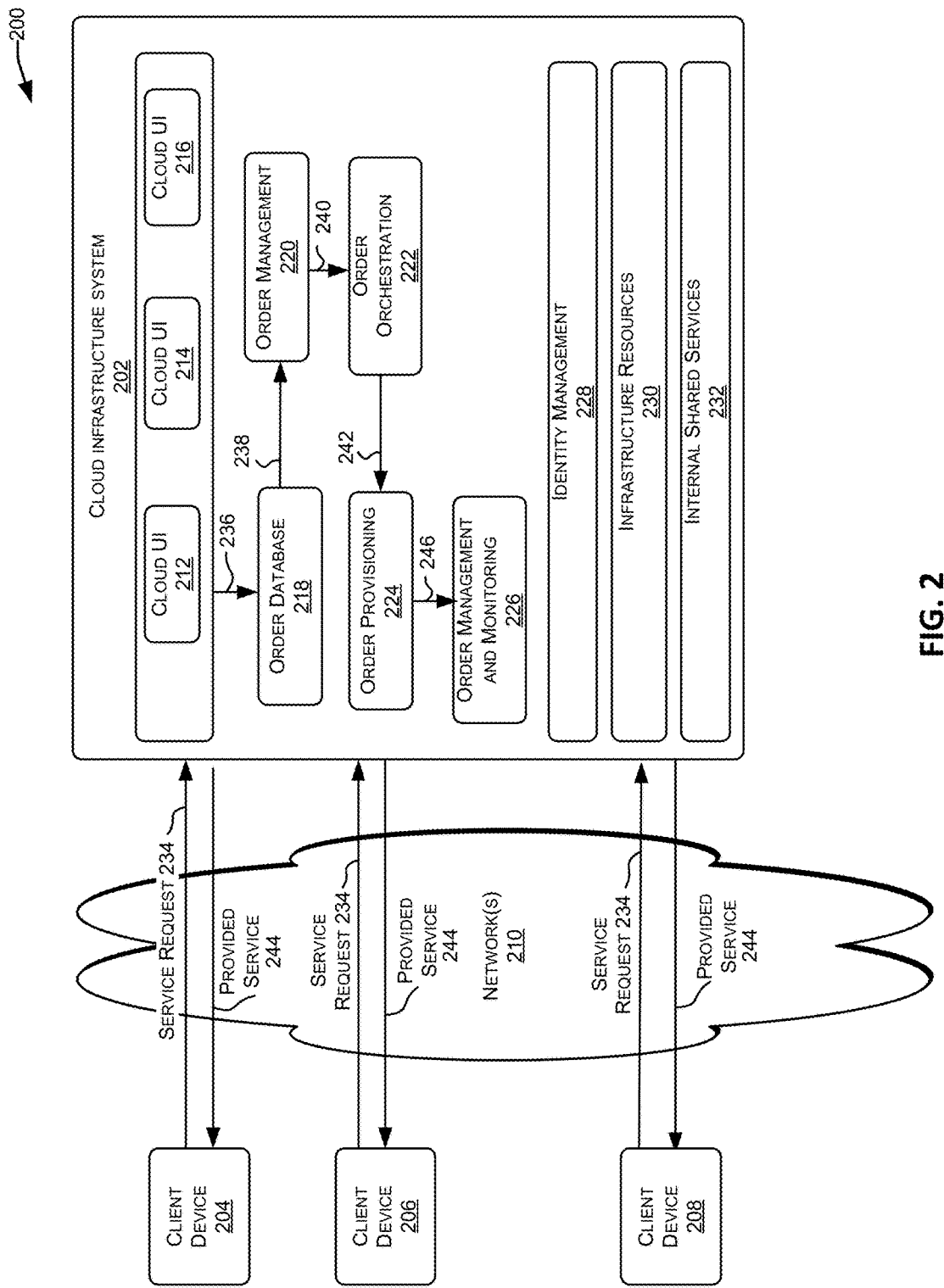
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
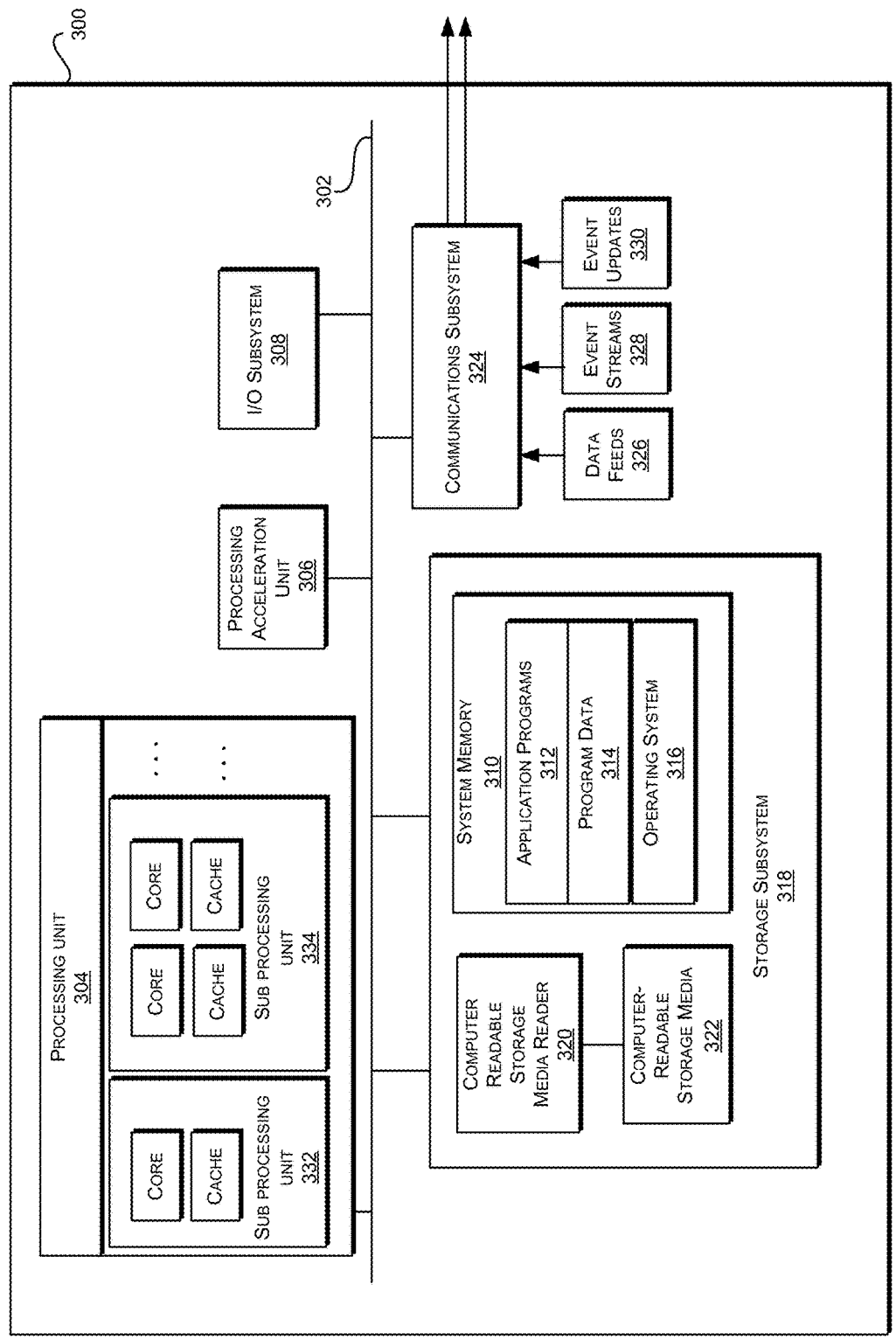
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as a blink detector that detects eye activity (e.g., 'blinking' while taking pictures and/or making a menu selection) from users and transforms the eye gestures as input into an input device. Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, Atom feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
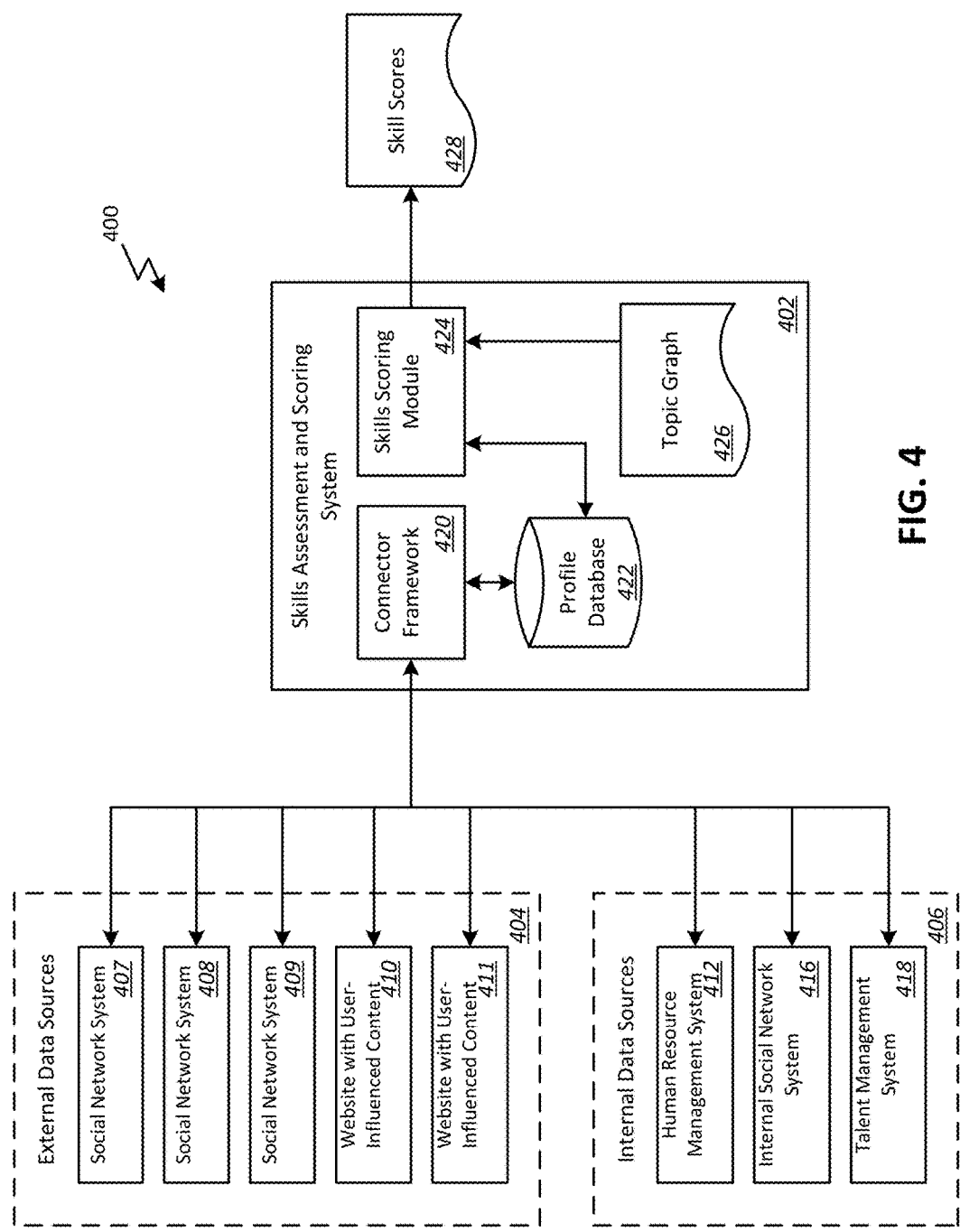
FIG. 4 is a block diagram illustrating, at a high-level, functional components of a system for assessing and scoring user proficiency in topics determined by data from social networks and other sources according to one embodiment of the present invention.

FIG. 4 is a block diagram illustrating, at a high-level, functional components of a system for assessing and scoring user proficiency in topics determined by data from social networks and other sources according to one embodiment of the present invention. In this example, the environment 400 includes a skills assessment and scoring system 402. The skills assessment and scoring system 402 may be one or more computer systems as described above collectively configured to operate in accordance with various embodiments of the present disclosure, such as those embodiments discussed below. In the illustrative example of FIG. 4, the skills assessment and scoring system 402 is configured to obtain data from external data sources 404 and internal data sources 406.

The skills assessment and scoring system 402 may be operated by an organization or on behalf of the organization. As such, external data sources 404 may be computer systems serving as a source of data where the computer systems are operated by and/or on behalf of entities different from the organization. Similarly, internal data sources 406 may be computer systems serving as sources of data where the computer systems are operated by and/or on behalf of the organization. It should be noted that the various data sources, internal and external, may be hosted in various ways. For example, one or more of the internal data sources may be hosted by the organization itself, such as in a data center or other facility of the organization. One or more of the internal data sources may be hosted by third parties. For example, one or more of the internal data sources may operate using facilities and hardware of a third party, yet may be programmatically managed by or on behalf of the organization. The hosting of external data sources may also vary in these ways.

Turning to the external data sources, example data sources include social network systems 407-409. A social networking system may be a publicly accessible computer system having users from the general public. The term "computer system," unless otherwise contradicted explicitly or by context, is intended to encompass both single computer instances (e.g. a single server) and multiple computer system instances, such as a network of computer system instances that collectively operate to achieve a result. Further, a computer system may also encompass multiple computer system instances that span multiple geographic regions and/or data center facilities. Returning to an example social networking system 407-409, the users of the social networking system may have accounts and corresponding profiles with the social network systems 407-409 and may engage in social networking activities. Example social networking activities include communicating electronically with other users of a social network system, either privately or publicly, expressing interest in content, and/or associating profiles with other profiles of the social network system which may be pursuant to mutual acceptance of the association by corresponding users. Specific examples of social networking systems include LinkedIn®, Facebook®, Twitter®, MySpace®, and others.

Generally, any suitable external data source may be used in accordance with various embodiments of the present disclosure. For example, various websites 410-411 with user-influenced content may serve as external data sources for the skills assessment and scoring system 402. A website with user-influenced content may be any public information resource in which content is associated with users of the website. Another example of a suitable website is an electronic profile in which a user is able to electronically provide a resume or history including or along with a list of topics or skills in which that user claims some experience and/or proficiency. Other users may be able to endorse the user for the topics or skills identified in the profile or may, in some cases, even endorse additional topics or skills not yet identified in the profile.

As with external data sources 404, internal data sources 406 may comprise one or more computer systems serving as an internal source of data for the skills assessment and scoring system 402. Typically, organizations utilize various computer systems in connection with management of their operations. An organization, for example, may utilize various computer systems for accounting, human resources, talent management, customer relationship management, internal social networking, internal information sources (e.g. internal websites), and the like. FIG. 4 shows some illustrative examples of suitable internal data sources 406 in accordance with an embodiment. For example, the internal data sources 406 include a human resource management system 412 which may be a computer system configured to perform various operations in connection with management of an organization's human resource needs.

The human resource management 412 may, for example, maintain data about employees of the organization and may allow administrators to update, add, and/or remove data for employees of the organization as the set of employees of the organization changes over time. The internal data sources 406 may also include an internal social network system 416. The internal social network system 416 may not be publicly accessible. That is, the universe of users of the internal social network system 416 may be limited, such as to employees of the organization, certain employees of the organization and/or individuals and/or computer systems to which the organization has provided authorization. As an example, the internal social network system 416 may be accessible to employees of the organization and certain vendors of the organization such as attorneys working in law firms for the organization. It should be noted and understood that, while referred to here as an "internal" social network system, this system may or may not be hosted internally. That is, it may actually be a hosted outside the company, but have a limited universe of employees, i.e., accessible by internal people. The internal data sources 406 may additionally or alternatively include a talent management system 418. The talent management system 418 may be a computer system configured to enable employees of the organization to perform various operations in connection with ensuring that the organization has appropriate personnel. For example, an employee of the organization may utilize the talent management system to track individuals who are engaged in the hiring process of the organization and/or to locate candidates for open positions. The talent management system may maintain resumes, may perform automated processing of received resumes, and the like. It should be noted and understood that this system might be hosted elsewhere, but would considered "internal" in the sense that only "internal" people have access to this system.

Turning to the skills assessment and scoring system 402, in an embodiment, the system includes multiple components. For example, the skills assessment and scoring system 402 can include a connecter framework 420. The connector framework 420 of the skills assessment and scoring system 402 may be a component (e.g. separate computer system instance(s) or programming module) configured to enable the skills assessment and scoring system 402 to obtain data from the external data sources 404 and internal data sources 406. The connector framework 420 may, for example, operate according to programming logic that enables the connector framework 420 to obtain data from numerous different data sources and combine the data in a manner suitable for processing by the skills assessment and scoring system 402 such as described below.

For example, many of the external data sources 404 and/or internal data sources 406 may provide data that is organized in different ways. The connector framework 420 may include programming logic to extract data and store data from multiple sources in a common manner such as in accordance with a common data storage schema. The connector framework 420 may obtain data from the various data sources in numerous ways. For example, in an embodiment, the connector framework 420 can be configured to obtain data from the various data sources according to application programming interfaces (APIs) of the various systems. For example, a social network system 407-409 may include an API for obtaining data available in the API. The connector framework 420 may include programming logic for making API calls in a manner acceptable to the social network system 407-409. Different social network systems may have different APIs and the connecter framework 420 may be configured appropriately to obtain data from the different sources.

The connector framework 420 may also be configured to obtain data in other ways. For example, data posted on web pages may be obtained by downloading web pages or other documents of the data source. For instance, a website may correspond to a domain name. The connector framework 420 may enable the skills assessment and scoring system 402 to obtain a web page or other document by using the URL. The connector framework 420 may analyze and receive documents and store data accordingly. The connector framework 420 may also utilize various screen scraping techniques and generally any technique in which data from a data source may be obtained.

As noted above, the connector framework 420 in an embodiment enables the skills assessment and scoring system 402 to obtain data from various different sources and store the data according to a common schema or generally in a manner suitable for use by the skills assessment and scoring system 402. In one embodiment, the data received through the connector framework 420 can be stored by the skills assessment and scoring system 402 into a profile database 422. The profile database 422 may be any data storage mechanism that enables the skills assessment and scoring system 402 to operate in accordance with the various embodiments described herein.

The profile database 422 may, for example, be a relational database comprising a computer system that utilizes storage to store data in multiple tables, where the tables associate some of the data with other data. For example a table may associate an identifier of an employee or other individual with skills data collected about the employee, such as data regarding the employee's work history, profile information, etc. collected from the various external data sources 404 and internal data sources 406.

According to one embodiment, the skills assessment and scoring system 402 can include a skills assessment and scoring module 424 that can use data gathered from the various external data sources 404 and internal data sources 406 to determine the set of topics or skills in which a user has expertise and score the identified and score the proficiency of the user on the identified topic or skill. Scoring proficiency of an individual on one or more topics can begin with the connector framework 420 collecting topic information related to the individual from a plurality of data sources 404 and 406 as described above. Once collected, one or more topics can be identified within the collected topic information by the skills scoring module 424 and/or connector framework 420. Each topic can comprise a particular skill or knowledge of the individual and identifying the topic can comprise, for example, the connector framework 420 reading specifically tagged or identified portions of the topic information, e.g., a professional qualifications or education section of a profile, endorsements, recommendations, etc. In other cases, identifying the topic can additionally or alternatively comprise the skills scoring module 424 parsing the collected topic information for any of a number of keywords. Other ways of identifying specific topics within the topic information are contemplated and considered to be within the scope of the present invention.

Once the topics within the topic information have been identified, a graph score for each identified topic can be calculated by the skills scoring module based on a topic graph 426. The topic graph 426 can comprise a Directed Acyclic Graph (DAG), wherein nodes of the graph represent topics and a degree of similarity between those topics based on proximity of the nodes in the graph. In another embodiment, rather than proximity, weighted edges which can be calculated between each pair of nodes can be used to determine similarity. Details of an exemplary topic graph 426 which may be utilized with embodiments of the present invention will be described further below with reference to FIG. 5. Generally speaking, the graph score can comprise a weighted score for topics directly matching a topic in the graph and/or topics similar to those found in the graph. That is, the skills scoring module 424, using the topic graph 426 can, in addition to identifying a particular topic directly matching between the collected topic information and the topic graph 426, can also identify similar skills related to the exact matching skills. For example, skills in C++ programming may imply skills in Java programming considering the similarities between the two. These similarities can be represented in the topic graph 426 and, based on this, the skills scoring module 424 can add one of these skills when the other is found in the collected topic information.

Calculating the graph score for each identified topic based on the topic graph 426 can comprise the skills scoring module 424 searching for each identified topic in the topic graph 426. For each identified topic matching a topic defined in the topic graph 426, the matching topic can be scored for a direct match by the skills scoring module 424. For example, the direct match can be given a full score or count, e.g., scored a 1. One or more related topics can also be identified by the skills scoring module 424 based on the topic graph 426, e.g., based on the categories and/or topics of neighboring nodes of the graph. The one or more related topics can be added by the skills scoring module 424 to the identified topics and scored based on a similarity to the matching topic indicated by the topic graph 426, i.e., based on the proximity of the nodes of the graph. These additional topics can be scored by the skills scoring module 424 based on distance cost where the distance from one node to another is assigned a value (e.g., 0.3) and the topic is weighted based on the distance in number of nodes along the shortest path between the direct matching node and the related topic node of the topic graph 426.

Also, a proficiency score can be calculated by the skills scoring module 424 for each topic based on a type for the topic information in which the topic was identified. Generally speaking, the proficiency score can comprise a weighted average of occurrences of the topic in the topic information weighted by a type of reference made to the topic in the topic information, e.g., a recommendation, endorsement, etc. The type of reference can comprise a recommendation of the individual by another, an accomplishment of the individual, or an endorsement of the individual by another. Each of these types can be weighted differently by the skills scoring module 424. For example, recommendations might be weighted more heavily than accomplishments which in turn might be weighted more heavily than endorsements. However, other arrangements may be configured depending upon the exact implementation. Additionally or alternatively, the weighting of these different types might vary depending upon the number of occurrences of a particular type. For example, as more recommendations are made, these may be weighted more heavily such as 1-2 recommendations weighted 0.3, 3-5 recommendations weighted 0.5, 5-10 recommendations weighted 0.8, and more than 10 recommendations weighted 1.0. Similar or other weighting arrangements can be applied to accomplishments and/or endorsements as well.

An overall expertise score can then be calculated by the skills scoring module 424 for each topic based on the graph score and the proficiency score for the topic. According to one embodiment, the overall expertise score for each topic can comprise a sum of the graph score for the topic and the proficiency score for the topic. In some cases, an indication of each topic and the overall expertise score for each topic can be stored by the skills scoring module 424 in profile information 422 for the individual. This profile information 422 along with the overall expertise scores for the topics stored by the skills scoring module 424 can be used, for example, when searching for subject matters experts.

In use, embodiments of the present invention may be particularly useful when looking for a very specific skill set for a specific location and position. One example would be a very technical VP who is willing to work hard and has a unique technical skill. Another case where embodiments of the present invention may be especially helpful include internal hiring where there is a need for an existing employee for a short term project or an internal candidate who is willing to travel or willing to move to a new location. In yet another example, such as seasonal hiring where a large number of employees are hired in a relatively short time, embodiments of the present invention can be used to quickly review candidates based on specific skills such as proficiency with particular Point of Sale equipment or software.

Figure 5:
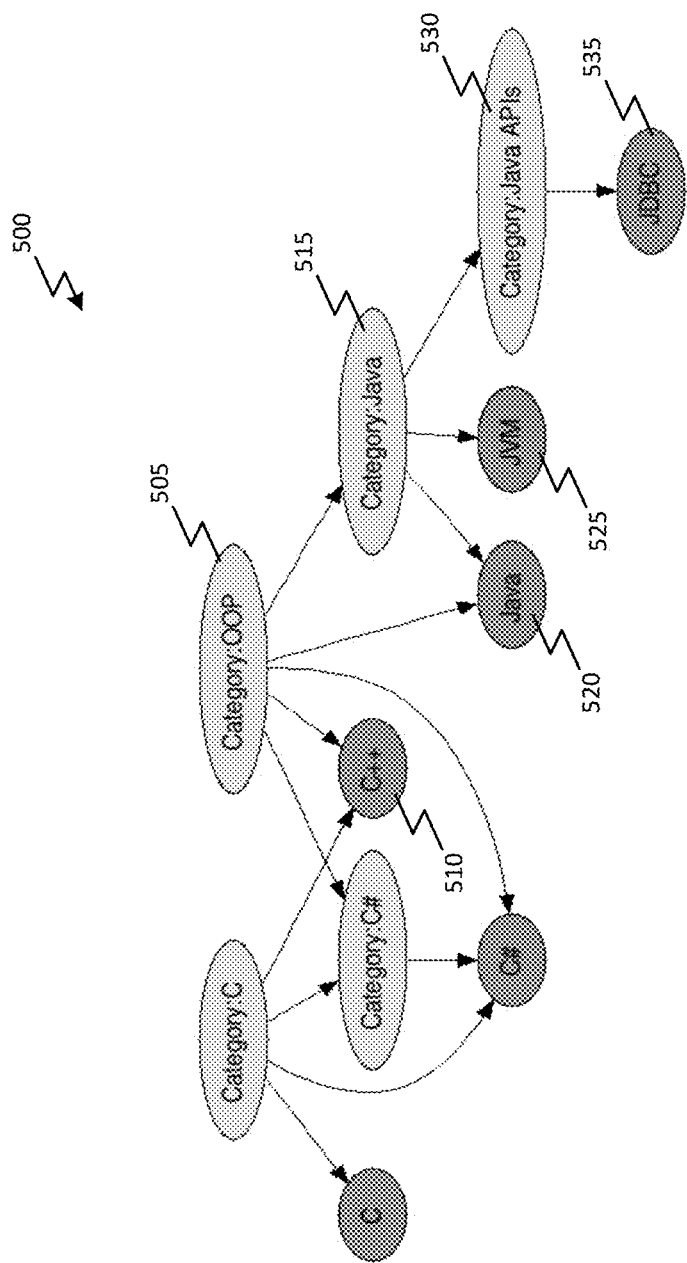
FIG. 5 illustrates an exemplary topic graph for defining subject matter areas according to one embodiment of the present invention.

FIG. 5 illustrates an exemplary topic graph for defining subject matter areas according to one embodiment of the present invention. As illustrated here, terms can be represented and related to one another in a hierarchy of the topic graph 500. The nodes 505-535 of the graph can represent categories 505, 515, and 530 and topics 510, 520, 525, and 535. This graph 500 can comprise a Directed Acyclic Graph (DAG) and can be pre-computed, directed, acyclic, and use only canonical names. A degree of similarity between the categories and topics can be represented by or based on proximity of the nodes 505-535 in the graph. The topics graph 500 can be used to determine similarity which can be represented as a score, e.g., from 0 to 1, based on how close the topics are to one another in the graph. For example, siblings such topic Java 520 and topic JVM 525 can be considered similar while the children of siblings such as topic JDBC 535 can be considered less similar than the siblings, and so on.

Figure 6:
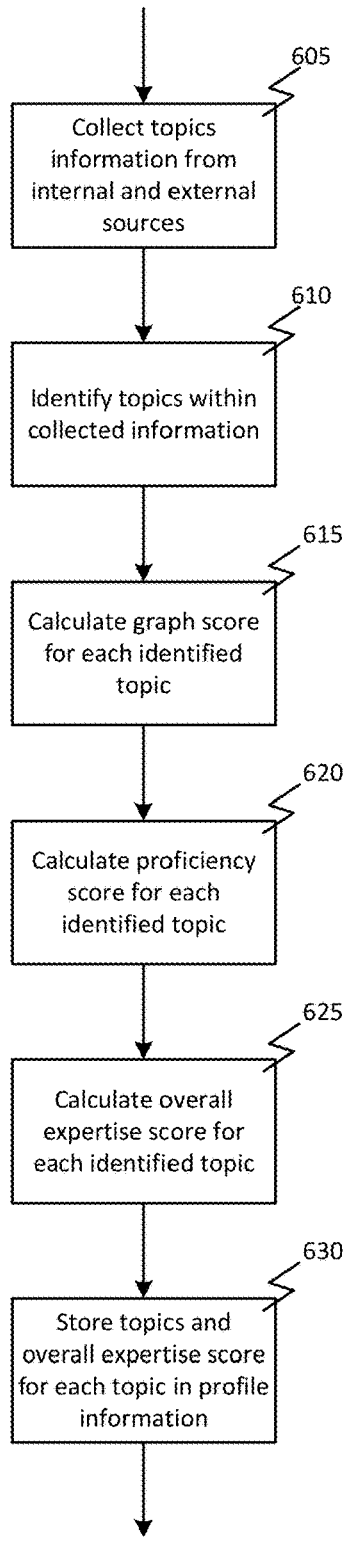
FIG. 6 is a flowchart illustrating a process for assessing and scoring user proficiency in topics determined by data from social networks and other sources according to one embodiment of the present invention.

FIG. 6 is a flowchart illustrating a process for assessing and scoring user proficiency in topics determined by data from social networks and other sources according to one embodiment of the present invention. As illustrated in this example, scoring proficiency of an individual on one or more topics can comprise collecting 605 topic information related to the individual from a plurality of data sources. As noted above, the data sources can include any number of internal or external data sources. In some cases, the plurality of data sources can comprise one or more social networks sites. Once collected 605, one or more topics can be identified 610 within the collected topic information. Each topic can comprise a particular skill or knowledge of the individual and identifying 610 the topic can comprise, for example, reading specifically tagged or identified portions of the topic information, e.g., a professional qualifications or education section of a profile, endorsements, recommendations, etc. In other cases, identifying 610 the topic can additionally or alternatively comprise parsing the collected topic information for any of a number of keywords. Other ways of identifying specific topics within the topic information are contemplated and considered to be within the scope of the present invention.

Once the topics within the topic information have been identified 610, a graph score for each identified topic can be calculated 615 based on a topic graph. Generally speaking, the graph score can comprise a weighted score for topics directly matching a topic in the graph and/or topics similar to those found in the graph. Additional details of an exemplary process for calculating 615 the graph score based on the topic graph will be described below with reference to FIG. 7. Also, a proficiency score can be calculated 620 for each topic based on a type for the topic information in which the topic was identified. Generally speaking, the proficiency score can comprise a weighted average of occurrences of the topic in the topic information weighted by a type of reference made to the topic in the topic information, e.g., a recommendation, endorsement, etc. Additional details of an exemplary process for calculating 620 the proficiency score will be described below with reference to FIG. 8. An overall expertise score can then be calculated 625 for each topic based on the graph score and the proficiency score for the topic. According to one embodiment, the overall expertise score for each topic can comprise a sum of the graph score for the topic and the proficiency score for the topic. In some cases, an indication of each topic and the overall expertise score for each topic can be stored 630 in profile information for the individual. This profile information along with the overall expertise scores for the topics stored 630 therein can be used, for example, when searching for subject matters experts.

Figure 7:
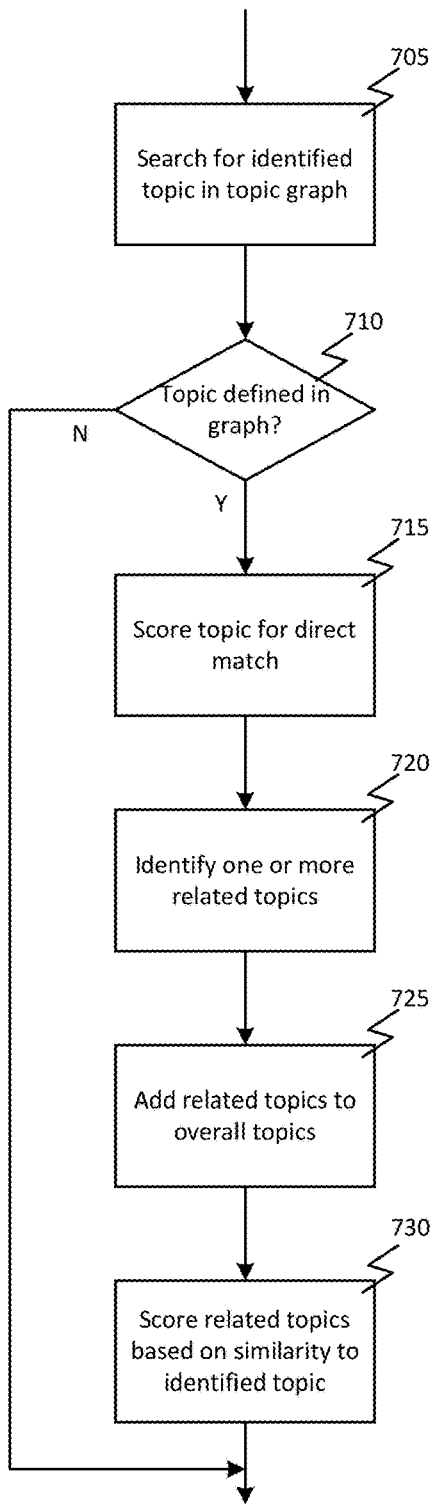
FIG. 7 is a flowchart illustrating additional details of an exemplary process for calculating a graph score according to one embodiment of the present invention.

FIG. 7 is a flowchart illustrating additional details of an exemplary process for calculating a graph score according to one embodiment of the present invention. As described above, the topic graph can comprise a Directed Acyclic Graph (DAG), wherein nodes of the graph represent topics and a degree of similarity between those topics based on proximity of the nodes in the graph. As illustrated in this example, calculating 615 the graph score for each identified topic based on the topic graph comprises searching 705 for each identified topic in the topic graph. For each identified topic matching 710 a topic defined in the topic graph, the matching topic can be scored 715 for a direct match. For example, the direct can be given a full score or count, e.g., scored a 1. One or more related topics can also be identified 720 based on the topic graph, e.g., based on the categories and/or topics of neighboring nodes of the graph. The one or more related topics can be added 725 to the identified topics and scored 730 the related topics based on a similarity to the matching topic indicated by the topic graph, i.e., based on the proximity of the nodes of the graph. These additional topics can be scored based on distance cost where the distance from one node to another is assigned a value (e.g., 0.3) and the topic is weighted based on the distance in number of nodes along the shortest path between the direct matching node and the related topic node.

Figure 8:
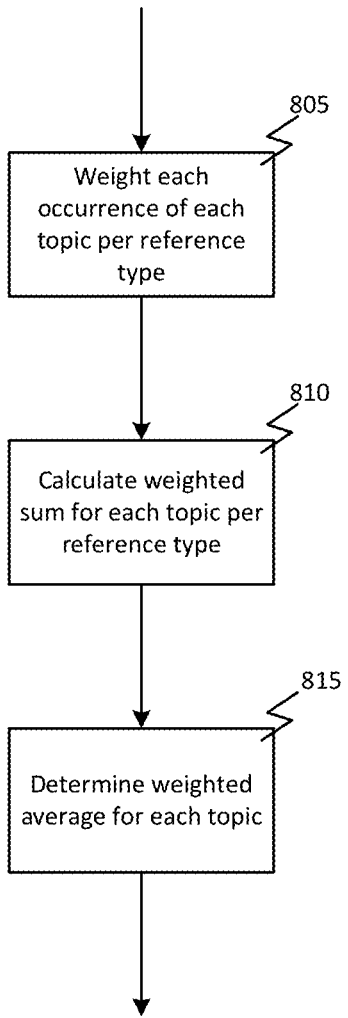
FIG. 8 is a flowchart illustrating additional details of an exemplary process for calculating a proficiency score according to one embodiment of the present invention.

FIG. 8 is a flowchart illustrating additional details of an exemplary process for calculating a proficiency score according to one embodiment of the present invention. As noted above, the proficiency score of each topic can comprise a weighted average of occurrences of the topic in the topic information and wherein each occurrence of each topic is weighted by a type of reference made to the topic in the topic information. Accordingly and as illustrated in this example, calculating a proficiency score can begin with weighting 805 each occurrence of each topic per reference type. The type of reference can comprise a recommendation of the individual by another, an accomplishment of the individual, or an endorsement of the individual by another. Each of these types can be weighted differently. For example, recommendations might be weighted more heavily than accomplishments which in turn might be weighted more heavily than endorsements. However, other arrangements may be configured depending upon the exact implementation. Additionally or alternatively, the weighting of these different types might vary depending upon the number of occurrences of a particular type. For example, as more recommendations are made, these may be weighted more heavily. Similar arrangements can be applied to accomplishments and/or endorsements as well.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for assessing a scoring proficiency of an individual on one or more topics, the method comprising:
    collecting topic information related to the individual from a plurality of data sources, wherein the plurality of data sources includes an external social network system and an internal social network system, the external social network system being publicly accessible, the internal social network system being publicly inaccessible, the external social network system providing topic information organized in a different way from topic information provided by the internal social network system;
    identifying a plurality of topics within the collected topic information, each topic of the plurality of topics comprising a particular skill or knowledge of the individual;
    calculating a graph score for each identified topic of the plurality of topics based on a pre-computed topic graph, the topic graph having a plurality of nodes, each node of the plurality of nodes corresponding to a skill or knowledge, wherein the topic graph comprises a Directed Acyclic Graph (DAG), wherein nodes of the graph represent topics, and wherein a degree of similarity between two topics respectively represented by two nodes of the graph is based on a number of nodes along the shortest path between the two nodes in the graph, and wherein calculating the graph score for each identified topic includes:
        searching the plurality of nodes of the topic graph for a matching skill or knowledge to the identified topic, the matching skill or knowledge corresponding to a matching node in the plurality of nodes; and
        searching neighboring nodes to the matching node in the topic graph for a related skill or knowledge to the identified topic, the related skill or knowledge corresponding to a related topic node;
    calculating a proficiency score for each identified topic of the plurality of topics based on a number of occurrences of the identified topic in the collected topic information weighted by type of reference to the identified topic in the collected topic information; and
    calculating an overall expertise score for each identified topic of the plurality of topics based on the graph score and the proficiency score for the respective identified topic.

2. The method of claim 1, further comprising storing an indication of each topic and the overall expertise score for each topic in profile information for the individual.

3. The method of claim 1, wherein the overall expertise score for each topic comprises a sum of the graph score for the topic and the proficiency score for the topic.

4. The method of claim 1, wherein the plurality of data sources comprise one or more social networks sites.

5. The method of claim 4, wherein the proficiency score of each topic comprises a weighted average of occurrences of the topic in the topic information and wherein each occurrence of each topic is weighted by a type of reference made to the topic in the topic information.

6. The method of claim 1, wherein calculating the graph score for each identified topic based on the topic graph further comprises, for each identified topic matching a topic defined in the topic graph, scoring the matching topic for a direct match, identifying one or more related topics based on the topic graph, adding the one or more related topics to the identified topics, and scoring the related topics based on a similarity to the matching topic indicated by the topic graph.

7. The method of claim 1, wherein the type of reference to the identified topic in the collected topic information comprises a recommendation of the individual by another, an accomplishment of the individual, or an endorsement of the individual by another.

8. A system comprising:
    a processor; and
    a memory coupled with and readable by the processor and storing therein a set of instructions which, when executed by the processor, causes the processor to assess a scoring proficiency of an individual on one or more topics by:
        collecting topic information related to the individual from a plurality of data sources, wherein the plurality of data sources comprise one or more social networks sites, and wherein the one or more social networks sites include an external social network system and an internal social network system, the external social network system being publicly accessible, the internal social network system being publicly inaccessible, the external social network system providing topic information organized in a different way from topic information provided by the internal social network system;
        identifying a plurality of topics within the collected topic information, each topic of the plurality of topics comprising a particular skill or knowledge of the individual;
        calculating a graph score for each identified topic of the plurality of topics based on a pre-computed topic graph, the topic graph having a plurality of nodes, each node of the plurality of nodes corresponding to a skill or knowledge, wherein the topic graph comprises a Directed Acyclic Graph (DAG), wherein nodes of the graph represent topics, and wherein a degree of similarity between two topics respectively represented by two nodes of the graph is based on a number of nodes along the shortest path between the two nodes in the graph, and wherein calculating the graph score for each identified topic includes:
            searching the plurality of nodes of the topic graph for a matching skill or knowledge to the identified topic, the matching skill or knowledge corresponding to a matching node in the plurality of nodes; and searching neighboring nodes to the matching node in the topic graph for a related skill or knowledge to the identified topic, the related skill or knowledge corresponding to a related topic node;

calculating a proficiency score for each identified topic of the plurality of topics based on a number of occurrences of the identified topic in the collected topic information weighted by type of reference to the identified topic in the collected topic information;

calculating an overall expertise score for each identified topic of the plurality of topics based on the graph score and the proficiency score for the respective identified topic, wherein the overall expertise score for each topic comprises a sum of the graph score for the topic and the proficiency score for the topic; and storing an indication of each topic and the overall expertise score for each topic in profile information for the individual.

9. The system of claim 8, wherein calculating the graph score for each identified topic based on the topic graph further comprises, for each identified topic matching a topic defined in the topic graph, scoring the matching topic for a direct match, identifying one or more related topics based on the topic graph, adding the one or more related topics to the identified topics, and scoring the related topics based on a similarity to the matching topic indicated by the topic graph.

10. The system of claim 9, wherein the proficiency score of each topic comprises a weighted average of occurrences of the topic in the topic information and wherein each occurrence of each topic is weighted by a type of reference made to the topic in the topic information.

11. The system of claim 8, wherein the type of reference to the identified topic in the collected topic information comprises a recommendation of the individual by another, an accomplishment of the individual, or an endorsement of the individual by another.

12. A non-tangible computer-readable medium comprising a set of instructions stored therein which, when executed by a processor, causes the processor to assess a scoring proficiency of an individual on one or more topics by:

collecting topic information related to the individual from a plurality of data sources, wherein the plurality of data sources comprise one or more social networks sites, wherein the one or more social networks sites include an external social network system and an internal social network system, the external social network system being publicly accessible, the internal social network system being publicly inaccessible, the external social network system providing topic information organized in a different way from topic information provided by the internal social network system;

identifying a plurality of topics within the collected topic information, each topic of the plurality of topics comprising a particular skill or knowledge of the individual;

calculating a graph score for each identified topic of the plurality of topics based on a pre-computed topic graph, the topic graph having a plurality of nodes, each node of the plurality of nodes corresponding to a skill or knowledge, wherein the topic graph comprises a Directed Acyclic Graph (DAG), wherein nodes of the graph represent topics, and wherein a degree of similarity between two topics respectively represented by two nodes of the graph is based on a number of nodes along the shortest path between the two nodes in the graph, and wherein calculating the graph score for each identified topic includes:

searching the plurality of nodes of the topic graph for a matching skill or knowledge to the identified topic, the matching skill or knowledge corresponding to a matching node in the plurality of nodes; and searching neighboring nodes to the matching node in the topic graph for a related skill or knowledge to the identified topic, the related skill or knowledge corresponding to a related topic node;

calculating a proficiency score for each identified topic of the plurality of topics based on a number of occurrences of the identified topic in the collected topic information weighted by type of reference to the identified topic in the collected topic information;

calculating an overall expertise score for each identified topic of the plurality of topics based on the graph score and the proficiency score for the respective identified topic, wherein the overall expertise score for each topic comprises a sum of the graph score for the topic and the proficiency score for the topic; and storing an indication of each topic and the overall expertise score for each topic in profile information for the individual.

13. The non-tangible computer-readable medium of claim 12, wherein calculating the graph score for each identified topic based on the topic graph further comprises, for each identified topic matching a topic defined in the topic graph, scoring the matching topic for a direct match, identifying one or more related topics based on the topic graph, adding the one or more related topics to the identified topics, and scoring the related topics based on a similarity to the matching topic indicated by the topic graph.

14. The non-tangible computer-readable medium of claim 13, wherein the proficiency score of each topic comprises a weighted average of occurrences of the topic in the topic information and wherein each occurrence of each topic is weighted by a type of reference made to the topic in the topic information.

15. The non-tangible computer-readable medium of claim 12, wherein the type of reference to the identified topic in the collected topic information comprises a recommendation of the individual by another, an accomplishment of the individual, or an endorsement of the individual by another.

* * * * *